Sept. 25, 1962 W. C. KNOEBEL 3,055,669
MULTI-PIECE PISTON RING ASSEMBLIES
Filed Aug. 1, 1960 3 Sheets-Sheet 1
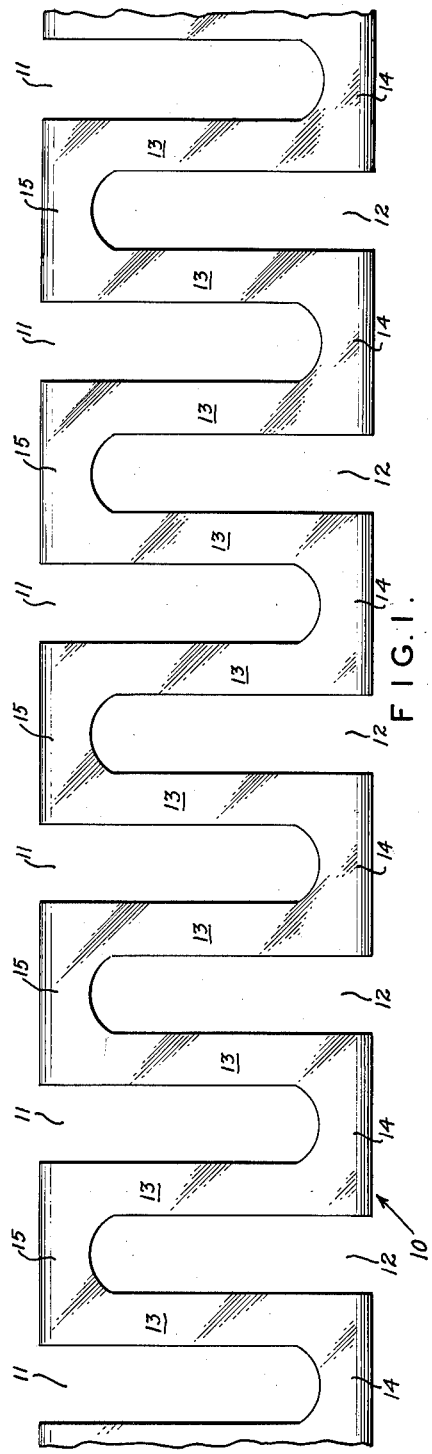
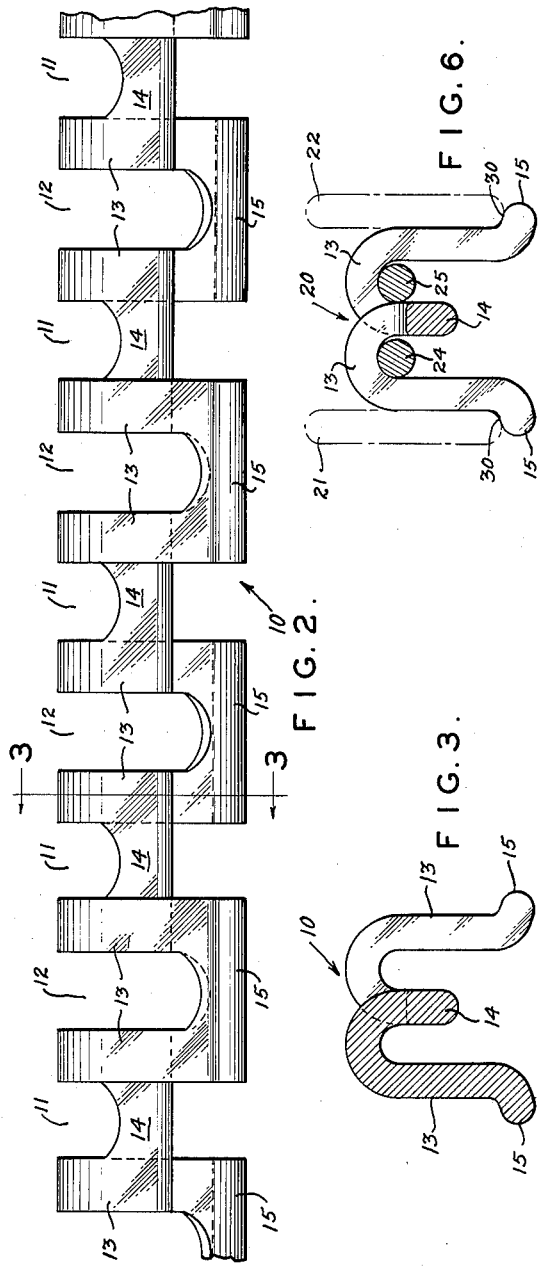
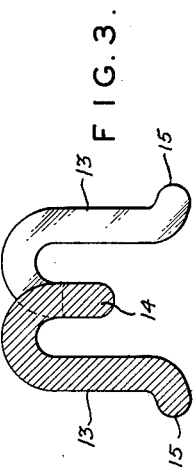
INVENTOR.
WALTER C. KNOEBEL
BY
Sutherland, Polster & Taylor
ATTORNEYS Sept. 25, 1962 W. C. KNOEBEL 3,055,669
MULTI-PIECE PISTON RING ASSEMBLIES
Filed Aug. 1, 1960 3 Sheets-Sheet 2

*INVENTOR.*
WALTER C. KNOEBEL
BY
Sutherland, Poleter & Taylor
ATTORNEYS

Sept. 25, 1962 W. C. KNOEBEL 3,055,669
MULTI-PIECE PISTON RING ASSEMBLIES
Filed Aug. 1, 1960 3 Sheets-Sheet 3

*INVENTOR.*
WALTER C. KNOEBEL
BY
*Sutherland, Polster & Taylor*
ATTORNEYS

United States Patent Office 3,055,669
Patented Sept. 25, 1962

3,055,669
MULTI-PIECE PISTON RING ASSEMBLIES
Walter C. Knoebel, St. Louis County, Mo., assignor to McQuay-Norris Manufacturing, St. Louis, Mo., a corporation of Delaware
Filed Aug. 1, 1960, Ser. No. 46,752
14 Claims. (Cl. 277—139)

This invention relates to full floating, multi-piece, piston ring assemblies of the non-bottoming type based upon a novel form of expander-spacer control ring, and more specifically to a control ring which is circumferentially compressible and expansible to produce control forces for split rings or rails in the assembly. These forces are radially and axially directed with respect to the piston and applied to the split rings or rails. One of the main distinguishing features of the control ring, hereinafter described, is its adaptability, and this particular feature of the control ring extends its usefulness to pistons in a wide range of sizes with different ring combinations, and/or, for individual fitting to adjust initial ring pressures. Further, the control ring is light and sensitive in operation and is characterized by a construction which makes possible a dual form of spring, acting as a coil compression spring circumferentially to produce radial forces and acting as a plurality of cantilever springs to produce axial forces. The control ring construction provides the means to transmit these forces to split rings or rails of the conventional expansible type. In the preferred form, the coil compression spring action of the control ring is relied upon for both radial and axial control of an expansible ring or rings.

One of the objects of this invention is to provide a piston ring assembly with a control ring which is light in weight and sensitive in operation.

Another object of this invention is to provide a control ring for a piston ring assembly which is adaptable by different adjustments in length for different requirements in control forces.

Another object of this invention is to provide a control ring for a piston ring assembly which is adaptable for use with different types of rings and for combinations of rings of different types.

Another object of this invention is to provide a control ring for a piston ring assembly based upon a simple, easily fabricated design which is adapted by simple forming operations to produce various desired configurations to serve as a multi-purpose control ring.

According to this invention, the expander-spacer control ring is formed from a strip of spring metal by a stamping or blanking operation which notches the strip alternately from opposite sides to form a strip with U-shaped reverse loops disposed in a single plane. This spring strip is then operated upon to bend alternate loops from a single plane in opposite directions to form a spring control ring with two rows of loops side by side so that looking endwise of the spring it resembles a small letter "m." The spring, when so formed, can then be wound on a mandrel or rolled, and then cut to a fixed length to form individual expander-spacer control rings to fit a certain piston size, it being understood that the free length of the spring control ring can be made suitable for a wide range of piston sizes. The length of each spring determines the free diameter of the expander-spacer control ring when the ends are abutting. Since the piston ring assembly is a full floating, non-bottoming ring assembly, the free diameter of the expander-spacer determines the control force exerted on the rings for any given cylinder size. With this type of ring, it would not ordinarily be possible to cut the ring at any transverse plane and still have the ring ends abut in a stable manner. This is due to the fact that the location of the cut can result in a pair of opposite ends which are asymmetrical. This is a normal condition in reverse loop types of rings, generally. Usually it is necessary to perform some separate forming of the ring at the opposite ring ends to provide abutting surfaces that are stable, and this rules out individual selection or adjustment for pistons of more than one diameter from the same strip or spring. This disadvantage is overcome, according to this invention, by split circumferentially expansible rings of round wire which are placed in the bight portions of the "m" to hold the ends of the ring in abutting relation regardless of where the ring is cut and thereby extend the range of ring adaptability. As will be pointed out hereinafter, the outer legs of the "m" can be formed in different ways to adapt the expander-spacer to different ring arrangements and combinations.

Further objects and advantages will appear from the following detailed description.

The following is a description in such full, clear, concise and exact terms as to enable any person skilled in the art to make and use the invention when taken in conjunction with the accompanying drawings, in which:

FIG. 1 is a top plan view of a strip of spring metal notched alternately from opposite sides to form a basic longitudinally compressible and expansible planar spring strip;

FIG. 2 is a side elevation of the strip with reversely extending loops alternately bent to form a spring strip shaped like a small letter "m" transversely;

FIG. 3 is a transverse section taken on the line 3—3 of FIG. 2;

FIG. 6 is a transverse section of the piston ring assembly in FIG. 4 and FIG. 5;

Figure 4:
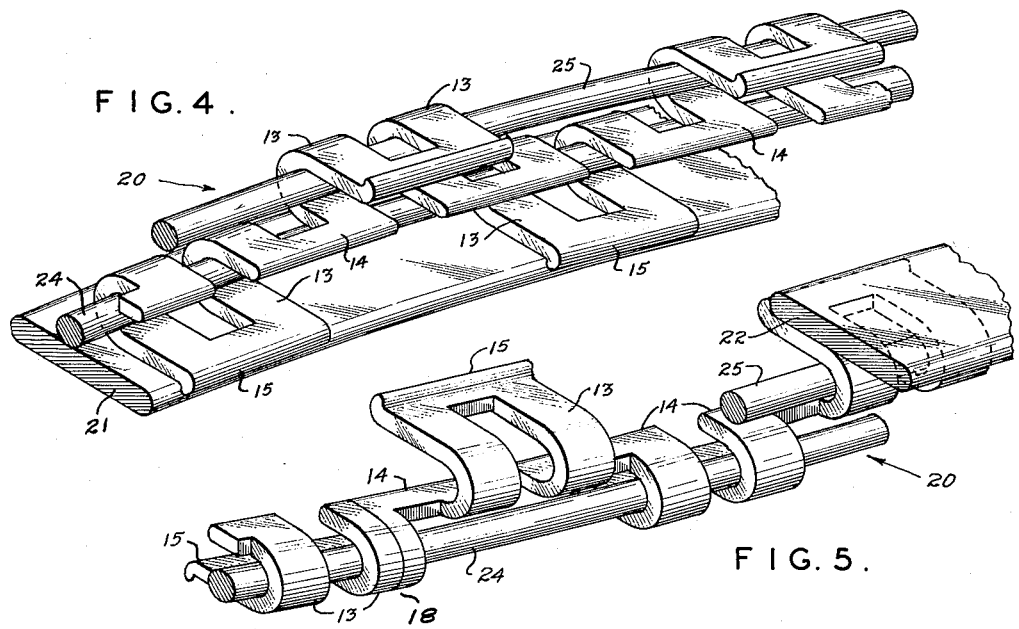
FIG. 4 and FIG. 5 are fragmentary perspective views of the spring shown in FIG. 2 and FIG. 3 after being formed into a control ring in a ring assembly with the rings and the ring guides in place.

For the purposes of illustration, there is shown in FIG. 1 a form of strip metal from which the expander-spacer control ring of this invention may be manufactured. With reference to this figure, a flat metal strip, such as generally indicated at 10, is blanked out by punching slots 11 in one side of the strip and slots 12 in the opposite side so spaced and in an alternate manner that a strip of spring metal remains which can generally be characterized as having a series of parallel legs, such as 13, on opposite sides of the slots, connected by means of bight portions or loops, such as 14 at one edge of the strip and 15 at the opposite edge of the strip 10. As hereinafter pointed out, subsequent forming operations on the strip bend the legs 13 into a form where the strip 10 becomes a circumferential compression spring. Of course, the strip 10 is a flat sheet of spring strip metal originally, and the subsequently formed expander-spacer control ring formed from the strip 10 will retain the characteristics of the basic strip 10. Instead of a flat strip 10, however, it might be possible to arrive at the same end result by using corrugated round wire in the same shape with parallel legs 13 and interconnecting loops 14 and 15. FIG. 1, therefore, is not regarded as restrictive of the invention, but merely illustrative.

Turning now to FIGS. 2 and 3, the strip 10 is shown in these figures formed into a straight compression spring 10. The forming operation may be of any conventional kind, such as performed by roller type dies, for example, with shaped rolls. In the forming operation, the pairs of legs connected at 15 are bent upon themselves into U-shapes alternately in opposite directions so that the bight portions 15 are located toward what will be the inner periphery of the expander-spacer control ring. Legs 13, which are in spaced side by side arrangement, have portions which are connected by the bight portions 15 extending in the same direction along one plane, an upper plane, and portions of the legs 13, which are in side by side relation and extending in the same direction, are located along another plane, the lower plane, which planes are parallel and spaced one above the other in what will be an axial direction when the spring 10 is formed into a ring. Other portions of all the legs 13, however, adjacent the bight portions 14 are offset with respect to the first mentioned portions from the spaced planes and extend toward a common plane parallel with and located between the first two planes with bight portions 14 on substantially a straight line. Thus, as can be seen in FIG. 3, a cross-sectional profile for the spring 10 is formed, which is shaped like a small letter "m" with spaced superposed guide channels. Also with reference to FIG. 3, the ends of the legs 13 adjacent the bight portions 15, connecting adjacent pairs of legs, are bent outwardly of the spaced planes in angular relation with adjacent portions of legs 13.

Figure 5:
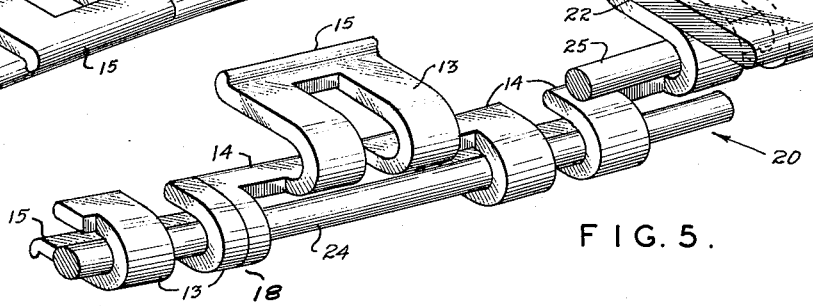

Turning now to FIGS. 5 and 6, the next forming operation rolls the straight spring 10 into round spring rings 20, which are circumferentially compressible and expansible. The bight portions 15 then become the control lugs backing up the inenr periphery of expansible piston rings 21 and 22 on opposite sides of the control ring 20 to form a multi-piece piston ring assembly. Since the spring 10 is formed of a continuous strip, portions are severed therefrom to form the spring rings 20, and even with pistons of one diameter the point at which the ring must be split cannot be uniformly controlled. Consequently, the point where the ring is cut may be anywhere in a portion of a leg 13 or between the legs 13, such as at 18. It is important that wherever the cut is made, suitable abutting ends are left on the split ring so as to accurately determine its free diameter with abutting ends in contact. It is from this basis that the radial control force on the expansible rings 21 and 22 is determined. Thus, it can be seen that unless the split portion of the ring provides a stable registering contact between the ends thereof, the control ring would not be stable in the piston groove, and it would be likely that the ends of the control ring 20 might slip into overlapping relationship thereby destroying the predetermined calibration of radial spring pressure. To avoid such an occurrence and yet dispense with the expense of individually forming the spring rings 20 with abutting ends of suitable size to provide stable contact, two wire rings, such as 24 and 25 (see FIGS. 4–6) are inserted in adjacent loops formed in legs 13. Rings 24 and 25 are of round wire and may extend substantially the whole periphery of the expander-spacer ring 20, although that is not necessary. The diameter of the wire in the rings 24 and 25 is such as not to interfere with the flexing of the legs 13 toward or away from each other when disposed in the superposed circumferential guide channels of the control ring 20. These spring wire rings 24 and 25 have a dual function. In the first place, the rings 24 and 25 extend across the joint 18 between the split ends of the ring 20 (as illustrated in FIG. 5) and are pressed outwardly into the loops in the legs 13 by their own expanding action. Thus, the wire spring rings 24 and 25 insure stable contact between the ends of the spring ring 20 regardless of where the ring 20 is split with relation to the legs 13. In the second place, the spring wire rings 24 and 25 can provide some radially directed reinforcement of the spring action in the expander-spacer ring 20, if desired. In any event there will be some frictional engagement between the legs 13 and the outer periphery of the spring rings 24 and 25 and some frictional resistance to spring action between legs 13. This frictional resistance will be effective during compression circumferentially of the expander-spacer ring 20 as well as during expansion. Each of these rings 24 and 25, therefore, produces a frictional damping force on the action of the spring rings 20. The degree of damping force, as well as the degree of spring reinforcement produced by these rings 24 and 25, are matters which can be readily controlled by a judicious selection of the size and diameter of the wire from which the rings are formed.

As pointed out heretofore, the portions of the legs 13 adjacent the bight portions 15 are bent so as to be located outwardly of the planes of legs 13, and as shown in FIG. 6, this provides an inclined control surface 30 on each pair of legs 13. This inclined control surface abuts the inner periphery of the expansible piston rings 21 and 22 urging them radially outwardly toward the cylinder wall and axially against the sides of the piston groove. By changing the angle of the surfaces 30, the axial control force exerted by ring 20 will also be changed because of the change in camming action on the inner periphery of the rings 21 and 22.

Figure 7:
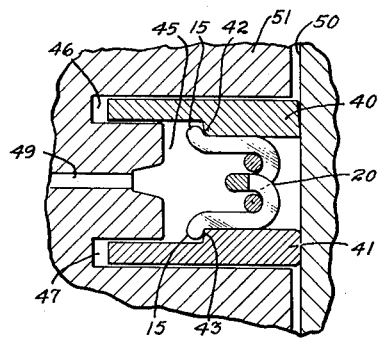
FIG. 7 is a transverse section of a modified form of ring assembly showing a portion of the piston and cylinder wall.

In FIG. 7 is shown a portion of a cylinder wall 50 and a portion of a piston 51 adjacent the cylinder wall 50, which has a ring groove 45 with upper and lower spaced sockets 46 and 47 and an oil vent passage 49. Expansible rails or rings 40 and 41 are moved in and out of the pockets 46 and 47 under the control of an expander-spacer control ring 20 of the kind heretofore described. In this modification, the ends 15 of the control ring bear against 42 and 43, respectively, on the periphery of a circumferential shoulder in each of the rings 40 and 41.

Figure 8:
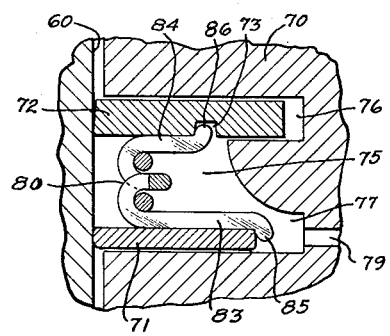
FIG. 8 is a transverse section of a second modified form of ring assembly showing a portion of the piston and cylinder wall.
Figure 10:
FIGS. 10 and 11 are side and top views respectively of the connector shown in FIG. 9.

In the prior modifications, the control ring 20 was a symmetrically formed spring control ring. However, it is perfectly possible to make the control ring spring asymmetrical, that is with the loops in the spring of different size, by simply forming the blank originally with pairs of legs 13, which are short, and pairs of legs 13, which are longer. Such a ring is shown in FIG. 8, in this ring 80 the pairs of legs 83 are longer than the pairs of legs 84, consequently, the outwardly directed lugs 85 and 86 are offset radially one from the other. In this modification, the piston is indicated as 70 and the cylinder wall portion 60. The ring 71 is an oil control ring and the ring 72 a compression ring. Both rings are received in a slot 75 in the piston 70, which has pairs of sockets 76 and 77 in spaced relation in which the rings 72 and 71 are mounted. Ring groove 75 may be vented with oil control holes, such as 79. Ring 72 has an annular shoulder on the side of groove 73 in its lower surface in which the lugs 86 on the legs 84 are received. Control ring 80 between the two rails 71 and 72 is a full floating, non-bottoming control ring constructed as heretofore described. Control ring 80 is both a spacer and an expander, and, therefore, operates in the same manner as the prior modifications. The use of an expander-spacer control ring is not limited to oil control rings, but, as shown, may be used with compression rings or in combined installations with both types.

Figure 11:
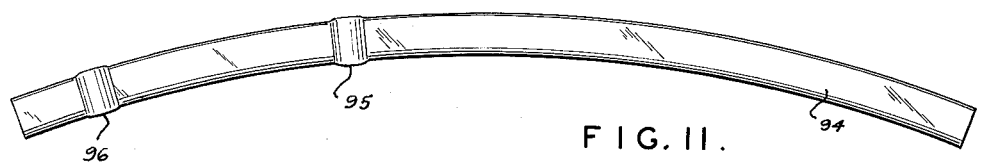
Figure 12:
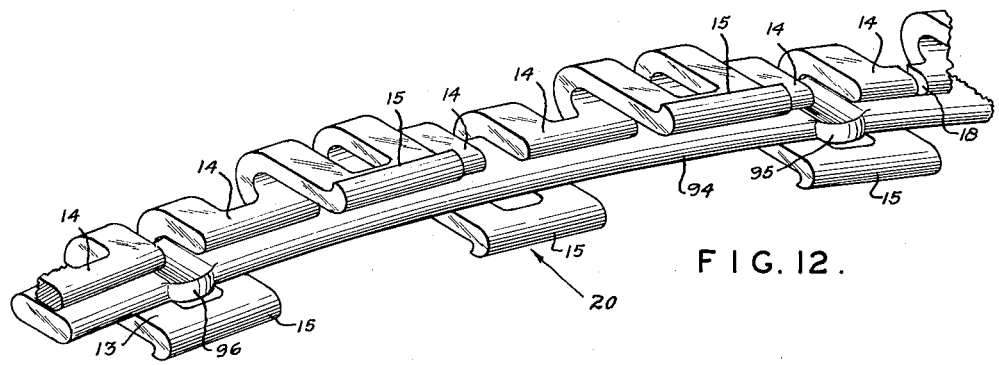
FIG. 12 is a perspective view on an enlarged scale showing the connector assembled with the control ring and extending across the joint in the control ring.

FIGS. 9–12 illustrate a different form of connector for the control ring 20 which performs in a similar manner to wire rings 24 and 25. In this modification the same reference characters are used to indicate like parts already illustrated and described in detail and this description will be limited to the differences. A flat strip of metal 94 formed as a segment of a circle as shown in FIG. 11 is provided with one or more dimples 95 and 96 by a staking operation or the like. The dimpled end of the strip is then adapted for insertion in one end of the split control ring 20 with the dimples 95 and 96 projecting between separate pairs of legs 13, as shown in FIG. 12. The part of the strip 94 beyond the dimples 95 and 96 extends across the joint 18, and on both sides of the joint 18 is located within one of the guide channels formed by the "m" section of the ring 20. In this case, it happens that joint 18 is in the lower channel of the "m" section of the ring 20 so the strip is in the lower channel. Now if the joint 18 should come in the upper channel of the "m" section of the control ring 20, then strip 94 is turned end for end and located in the upper channel instead of the lower channel. In other words, the same strip will form a connector in either channel by simply reversing it end for end.

Figure 9:
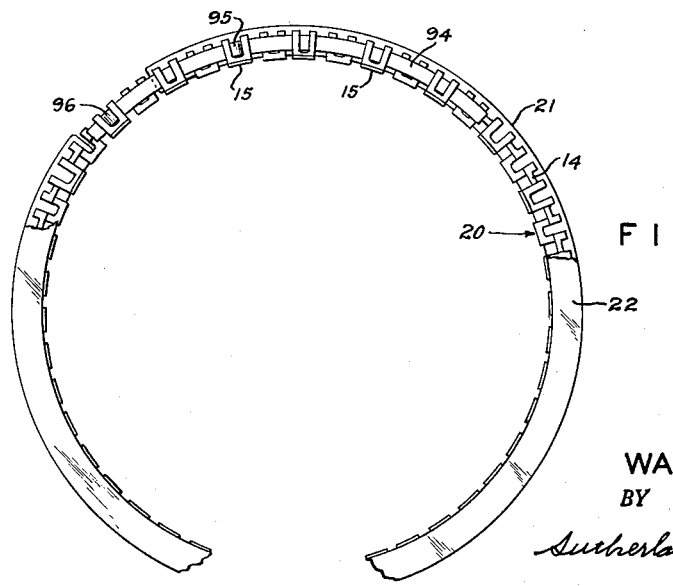
FIG. 9 is a bottom plan view of the same piston ring assembly shown in FIGS. 4–6 with a modified form of connector.

FIG. 9 shows the assembly including the rails 21 and 22, control ring 20 and connector 94. As shown, connector 94 extends through the joint 18 and beyond. The strip 94 may be a split ring instead of a small segment of a ring in which case it would reinforce the control action of ring 20 both in a radial and axial direction. It is possible to use strips 94 in pairs, one in each channel of the "m" section of control ring 20 to augment the control functions above-mentioned.

Changes in and modifications of the constructions described may be made without departing from the spirit of my invention or sacrificing its advantages.

Having thus described the invention, what is claimed and desired to be secured by Letters Patent is:

1. A control ring for a multi-piece piston ring assembly including a split expander-spacer ring with a minimum internal operating diameter greater than the maximum diameter at the bottom of the piston ring groove in which it is adapted to be received, and of a radial width and axial thickness adapted to be wholly received in a piston ring groove between a pair of spaced expansible piston rings to form a piston ring assembly of the full floating, non-bottoming, type with the ends of said split expander-spacer ring in contact, said expander-spacer ring comprising, a generally round spring ring with a plurality of resilient generally radially extending legs located in spaced side by side arrangement with portions of some of said legs extending in the same direction along one plane and with portions of some of said legs extending in the same direction along another plane, parallel with said one plane, and axially spaced therefrom, and other portions of all of said legs offset from said spaced planes and extending along a common plane parallel with and located between said spaced planes, and bight portions connecting some of said legs in each of said spaced planes so as to form a continuous compression spring of connected legs for said expander-spacer ring which is expandable circumferentially to produce a radially outwardly directed force for said piston ring assembly.

2. A control ring for a multi-piece piston ring assembly including a split expander-spacer ring with a minimum internal operating diameter greater than the maximum diameter at the bottom of the piston ring groove in which it is adapted to be received, and a radial width and axial thickness adapted to be wholly received in a piston ring groove between a pair of spaced expansible piston rings to form a piston ring assembly of the full floating, non-bottoming type with the ends of said split expander-spacer ring in contact, said expander-spacer ring comprising, a generally round spring ring with a plurality of resilient generally radially extending legs located in spaced side by side arrangement with portions of some of said legs extending in the same direction along and outwardly of one plane and with portions of said legs extending in the same direction along and outwardly of another plane, parallel with said one plane and axially spaced therefrom and other portions of all of said legs offset from said spaced planes and extending along a common plane parallel with and located between said spaced planes, and bight portions connecting some of said legs in each of said spaced planes so as to form a continuous compression spring of connected legs for said expander-spacer ring which is expandable circumferentially to produce a radially outwardly directed force for said piston ring assembly at portions located outwardly of said one plane and at portions located outwardly of said another plane.

3. A control ring for a multi-piece piston ring assembly including a split expander-spacer ring with a minimum internal operating diameter greater than the maximum diameter at the bottom of the piston ring groove in which it is adapted to be received and a radial width and axial thickness adapted to be wholly received in a piston ring groove between a pair of spaced expansible piston rings to form a piston ring assembly of the full floating, non-bottoming type with the ends of said split expander-spacer ring in contact, said expander-spacer ring comprising, a generally round spring ring with a plurality of resilient generally radially extending legs located in spaced side by side arrangement with portions of some of said legs extending in the same direction along one plane and also outwardly thereof and with portions of some of said legs extending in the same direction along and outwardly of another plane parallel with said one plane and axially spaced therefrom, and other portions of all of said legs offset from said spaced planes and extending along a common plane parallel to and located between said spaced planes and in the same direction so as to form a cross-sectional profile like a small letter "m", and bight portions connecting some of said legs in each of said spaced planes so as to form a continuous compression spring of connected legs for said expander-spacer ring which is expandable circumferentially to produce a radially outwardly directed force for said piston ring assembly at portions located outwardly of said one plane and at portions located outwardly of said another plane.

4. A control ring for a multi-piece piston ring assembly including a split expander-spacer ring with a minimum internal operating diameter greater than the maximum diameter at the bottom of the piston ring groove in which it is adapted to be received and of a radial width and axial thickness adapted to be wholly received in a piston ring groove between a pair of spaced expansible piston rings to form a piston ring assembly of the full floating, non-bottoming type with the ends of said split expander-spacer ring in contact, said expander-spacer ring comprising, a generally round spring ring with a plurality of resilient generally radially extending legs located in spaced side by side arrangement with portions of some of said legs extending in the same direction along and outwardly of one plane and with portions of some of said legs extending in the same direction along and outwardly of another plane parallel with said one plane and axially spaced therefrom and other portions of all of said legs offset from said spaced planes and extending along a common plane parallel to and located between said spaced planes, and in the same direction so as to form a cross-sectional profile for said spring ring like a small letter "m" means connecting some of said legs in each of said spaced planes so as to form a continuous compression ring of connected legs for said expander-spacer ring which is expandable circumferentially to produce radially outwardly directed force for said piston ring assembly and a pair of spring rings of round wire seated within and between the legs of said expander-spacer ring in the grooves of said "m" cross-sectional profile.

5. A piston ring assembly including a pair of spaced expansible piston rings and a split expander-spacer ring with a minimum internal operating diameter greater than the maximum diameter at the bottom of the piston ring groove in which said assembly is adapted to be received, and of a radial width and axial thickness adapted to be wholly received in a piston ring groove between said pair of spaced expansible piston rings to form a piston ring assembly therewith of the full floating, non-bottoming, type with the ends of said split expander-spacer ring in contact, said expander-spacer ring comprising, a generally round spring ring with a plurality of resilient generally radially extending legs located in spaced side by side arrangement with first portions of some of said legs extending in the same direction along and engaging the inner radial face of one of said pair of spaced expansible piston rings, and with second portions of some of said legs extending in the same direction along and engaging the inner radial face of the other of said pair of spaced expansible piston rings and acting as a resilient spacer therebetween, and other portions of all of said legs extending in a generally radial direction and offset from said first portions, bight portions connecting said legs in pairs with some of said bight portions disposed annularly between said first leg portions and said second leg portions and ring elements between adjacent leg portions extending across the split in said expander-spacer ring.

6. A piston ring assembly including a pair of spaced expansible piston rings and a split expander-spacer ring with a minimum internal operating diameter greater than the maximum diameter at the bottom of the piston ring groove in which it is adapted to be received, and a radial width and axial thickness adapted to be wholly received in a piston ring groove between said pair of spaced expansible piston rings to form a piston ring assembly of the full floating non-bottoming, type with the ends of said split expander-spacer ring in contact, said expander-spacer ring comprising, a generally round spring ring with a plurality of resilient generally radially extending legs located in spaced side by side arrangement with portions of some of said legs extending in the same direction along and engaging the inner radial face and inner periphery of one of said pair of spaced expansible piston rings, and with portions of some of said legs extending in the same direction along and engaging the inner radial face and inner periphery of the other of said pair of spaced expansible piston rings and acting thereon in a resilient manner in both a radial and axial direction, and other portions of all of said legs extending in a generally radial direction offset from said first portions, bight portions connecting said legs in pairs with said bight portions disposed between said leg portions, and a ring element between adjacent portions of said leg portions extending across the split in said expander-spacer ring.

7. A control ring for a multi-piece piston ring assembly including a plit expander-spacer ring with a minimum internal operating diameter greater than the maximum diameter at the bottom of the piston ring groove in which it is adapted to be received, and of a radial width, and axial thickness, adapted to be wholly received in a piston ring groove between a pair of spaced expansible piston rings to form a piston ring assembly of the full floating, non-bottoming, type with the ends of said split expander-spacer ring in contact, said expander-spacer ring comprising, a generally round circumferentially compressible spring ring with a plurality of resilient, generally radially extending legs bent in reverse direction into axially spaced planes to form a circumferential guide channel and a spring wire in said channel to maintain the ends of said split ring in abutting relation.

8. A control ring for a multi-piece piston ring assembly including a split expander-spacer ring with a minimum internal operating diameter greater than the maximum diameter at the bottom of the piston ring groove in which it is adapted to be received, and of a radial width, and axial thickness, adapted to be wholly received in a piston ring groove between a pair of spaced expansible piston rings to form a piston ring assembly of the full floating, non-bottoming, type with the ends of said split expander-spacer ring in contact, said expander-spacer ring compris- ing, a generally round circumferentially compressible spring ring with a plurality of resilient, generally radially extending legs bent in reverse directions into axially spaced planes to form a circumferential guide channel and means in said guide channel coacting with said resilient generally radially extending legs for holding said split ring end in abutting relation and for damping the spring action of said round spring ring.

9. A control ring for a multi-piece piston ring assembly including a split expander-spacer ring with a minimum internal operating diameter greater than the maximum diameter at the bottom of the piston ring groove in which it is adapted to be received, and of a radial width, and axial thickness, adapted to be wholly received in a piston ring groove between a pair of spaced expansible piston rings to form a piston ring assembly of the full floating, non-bottoming, type with the ends of said split expander-spacer ring in contact, said expander-spacer ring comprising, a generally round spring ring with a plurality of resilient generally radially extending legs located in spaced side by side arrangement with portions of some of said legs extending in the same direction along one plane and with portions of some of said legs extending in the same direction along another plane, parallel with said one plane, and axially spaced therefrom, and other portions of all of said legs offset from said spaced planes and extending toward a common plane parallel with and located between said spaced planes, bight portions connecting said legs in each of said spaced planes in pairs so as to form a continuous compression control spring ring of connected legs for said expander-spacer ring with superposed circumferential guide channels, and means in said channels for maintaining the ends of said split ring in abutting relation and frictionally engaging said legs to damp the spring action of said expander-spacer control ring.

10. A piston ring assembly including a pair of spaced expansible piston rings, at least one of which has a circumferential shoulder on its inner radial face and a split expander-spacer ring with a minimum internal operating diameter greater than the maximum diameter at the bottom of the piston ring groove in which it is adapted to be received, and of a radial width, and axial thickness, adapted to be wholly received in a piston ring groove between said pair of spaced expansible piston rings to form a piston ring assembly of the full floating, non-bottoming, type with the ends of said split expander-spacer ring in contact, said expander-spacer ring comprising, a generally round spring ring with a plurality of resilient generally radially extending legs located in spaced side by side arrangement with portions of some of said legs extending in the same direction toward one plane, and with portions of some of said legs extending in the same direction toward another plane, parallel with said one plane, and axially spaced therefrom and other portions of all of said legs offset from said spaced planes and extending toward a common plane parallel with and located between said spaced planes, bight portions connecting said legs in pairs in each of said spaced planes so as to form a continuous compression spring of connected legs for said expander-spacer ring which is expandable circumferentially to produce a radially outwardly directed force on said expansible piston rings, and camming surfaces on said spaced legs about the inner periphery of said expander-spacer ring for transferring said radially outwardly directed force to said expansible piston rings.

11. A control ring for a piston ring assembly including a control ring and a pair of rails spaced by said control ring, comprising a spring with legs extending in substantially the same direction with ends of said legs connected in spaced relation in pairs by bight portions in said spring located at opposite ends of said pairs of legs in an alternate manner, all of said bight portions at one end of said legs being arranged along a circular path located in a single plane and said bight portions at the opposite ends of said legs being located along circular paths on either one side or the other side of said single plane to form a ring with an "m" section having spaced circular shaped channels formed by said legs.

12. The combination defined in claim 11 in which said bight portions at the opposite ends have angularly related surfaces adapted to engage the inner periphery of said rails when held axially spaced by said legs.

13. The combination as defined in claim 11 in which said control ring is split and has a connector in the form of a ring held in one of said spaced circular channels to extend across the joint in said split control ring.

14. The combination as defined in claim 11 in which said control ring is split and a connector in one of said channels extends across the joint in said split control ring to hold the ends of said split control ring in alignment to butt one with the other, said connector being formed of a flat strip of segmental shape with a dimple for securing said strip at one end between adjacent legs of said spring.

References Cited in the file of this patent

UNITED STATES PATENTS 2,587,888   Phillips _____ Mar. 4, 1952